United States Patent
Sugimoto et al.

(10) Patent No.: US 7,192,325 B2
(45) Date of Patent: *Mar. 20, 2007

(54) PROCESS FOR PRODUCING PHOSPHOR AND PLASMA DISPLAY PANEL UNIT

(75) Inventors: Kazuhiko Sugimoto, Kyoto (JP); Junichi Hibino, Kyoto (JP); Masaki Aoki, Mino (JP); Yoshinori Tanaka, Hirakata (JP); Hiroshi Setoguchi, Takatsuki (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 129 days.

This patent is subject to a terminal disclaimer.

(21) Appl. No.: 10/512,443

(22) PCT Filed: Feb. 19, 2004

(86) PCT No.: PCT/JP2004/001903

§ 371 (c)(1),
(2), (4) Date: Oct. 25, 2004

(87) PCT Pub. No.: WO2004/074402

PCT Pub. Date: Sep. 2, 2004

(65) Prior Publication Data

US 2005/0200277 A1    Sep. 15, 2005

(30) Foreign Application Priority Data

Feb. 20, 2003    (JP) .............................. 2003-042867

(51) Int. Cl.
*H01J 9/00*    (2006.01)
(52) U.S. Cl. ................................. 445/24; 252/301.4 R
(58) Field of Classification Search ........ 313/582–587; 252/301.4 R; 445/24
See application file for complete search history.

(56) References Cited

U.S. PATENT DOCUMENTS

2004/0051440 A1*    3/2004    Sugimoto et al. ........... 313/486

FOREIGN PATENT DOCUMENTS

| JP | 2000-290649 | 10/2000 |
| JP | 2002-180043 | 6/2002 |
| JP | 2002-334656 | 11/2002 |

* cited by examiner

*Primary Examiner*—Joseph Williams
*Assistant Examiner*—Bumsuk Won
(74) *Attorney, Agent, or Firm*—Wenderoth, Lind & Ponack, L.L.P

(57) ABSTRACT

Fine particles of a phosphor are weighed, mixed, and filled. Provided after this step are at least one step of firing the particles in a reducing atmosphere, and a step of pulverizing, dispersing, rinsing, drying and then performing oxygen ion implantation treatment for implanting oxygen ions and annealing the particles, after the step of treatment in the reducing atmosphere. This method recovers oxygen vacancy in the host crystal of the phosphor.

2 Claims, 3 Drawing Sheets

PROCESS FOR PRODUCING PHOSPHOR AND PLASMA DISPLAY PANEL UNIT

TECHNICAL FIELD

The present invention relates to a plasma display panel device and a method of fabricating phosphors therefor. Especially, the phosphors can preferably be used for image display devices represented by a plasma display device, and illuminators represented by a rare-gas discharge lamp and a high-load fluorescent lamp.

BACKGROUND ART

Among color display devices used for image display on a computer or television screen, a plasma display panel device has recently been drawing attention, as a large and thin color display device having light weight.

A plasma display device performs additive color mixing of three primary colors (red, green, and blue) to provide full-color display. For the full-color display, a plasma display device has phosphor layers for emitting the respective three primary colors, i.e. red, green, and blue. In discharge cells of a plasma display device, discharge of a rare gas generates ultraviolet light having a wavelength up to 200 nm. The ultraviolet light excites phosphors of respective colors to generate visible light of respective colors.

Known as phosphors of the respective colors are (Y, Gd)$BO_3$:$Eu^{3+}$ and $Y_2O_3$:$Eu^{3+}$ for red emission, (Ba, Sr, Mg)O.a$Al_2O_3$:$Mn^{2+}$ and $Zn_2SiO_4$:$Mn^{2+}$ for green emission, and $BaMgAl_{10}O_{17}$:$Eu^{2+}$ for blue emission, for example.

Among these, for a blue phosphor called BAM that contains $BaMgAl_{10}O_{17}$ as its base material, Eu, i.e. its center of emission, must be activated divalent, in order to improve emission luminance. Thus, this phosphor is fabricated by firing in a reducing atmosphere (see "Phosphor Handbook", Phosphor Research Society, Ohmsha, pp.170, for example.) This is because, if the phosphor is fired in an oxidizing atmosphere, Eu is activated trivalent and Eu cannot substitutes for the bivalent Ba position properly in its host crystal. For this reason, Eu cannot be an active emission center, and this deteriorates emission luminance. Further, Eu does not accomplish its original purpose, and generates red emission peculiar to $Eu^{3+}$.

For a red phosphor, europium-activated yttrium oxysulfide ($Y_2O_2S$:$Eu^{3+}$), because Eu must be activated trivalent, the phosphor is fabricated by firing in an oxidizing atmosphere. Meanwhile, for a phosphor in which its host crystal is made of an oxide, it is considered that oxygen atoms are deprived from the host crystal in firing and thus oxygen vacancy is generated in the phosphor. Disclosed as a method of recovering such oxygen vacancy is firing the materials in an inert gas containing oxygen to activate Eu trivalent and provide $Y_2O_2S$:$Eu^{3+}$ (see Japanese Patent Unexamined Publication No.2000-290649).

However, in comparison with an oxide phosphor fabricated by firing in an oxidizing atmosphere, for an oxide phosphor fabricated by firing in a reducing atmosphere, the reducing atmosphere tends to deprive oxygen from the host crystal and oxygen vacancy in the host crystal increases. Further, when an oxide phosphor that must be fired in a reducing atmosphere is fired in an oxidizing atmosphere, keeping the number of valences inherent in the activator is difficult.

In other words, when a phosphor having much oxygen vacancy in its host crystal is subjected to high-energy ultraviolet light (having a wavelength of 147 nm) irradiated by a plasma display device and ion impact caused by discharge, the phosphor is likely to degrade with time. This is because, in the sites having oxygen vacancy, the bond between atoms is weak, and application of high-energy ultraviolet light and ion impact to the sites tends to disturb the crystal structure and make the sites amorphous. The amorphous sites mean deterioration of the host crystal. In a plasma display device, such deterioration leads to luminance degradation with time, color shift caused by chromaticity change, and image burn.

When an oxide phosphor that must be fired in a reducing atmosphere is fired in an oxygen atmosphere for the purpose of recovery of oxygen vacancy, for a BAM phosphor, for example, Eu is activated to $Eu^{3+}$ and this causes considerable luminance degradation.

The present invention addresses these problems, and aims to provide a method of fabricating a phosphor, and a plasma display panel using the phosphor. With the fabricating method, even for a phosphor in which its emission center, Eu or Mn, must be activated bivalent, and its host crystal is made of an oxide, its oxygen vacancy can be recovered without deterioration of emission luminance.

DISCLOSURE OF THE INVENTION

The present invention is a plasma display device in which a plurality of discharge cells having at least one color is disposed, phosphor layers having a color corresponding to the respective discharge cells are disposed, and the phosphor layers are excited by ultraviolet light to emit light. At least one phosphor layer among the phosphor layers is made of a phosphor that has a composition formula of $Ba_{(1-x-y)}Sr_yMgAl_{10}O_{17}$:$Eu_x$ and undergoes oxygen ion implantation treatment for implanting oxygen ions.

The phosphor of such composition has a high emission luminance. Additionally, the oxygen ion implantation treatment can recover oxygen vacancy in the host crystal without decreasing the emission luminance, thus providing a plasma display device having inhibited luminance degradation during actual operation.

DETAILED DESCRIPTION OF PREFERRED EMBODIMENT

An exemplary embodiment of the present invention is detailed hereinafter with reference to the accompanying drawings.

Figure 1:
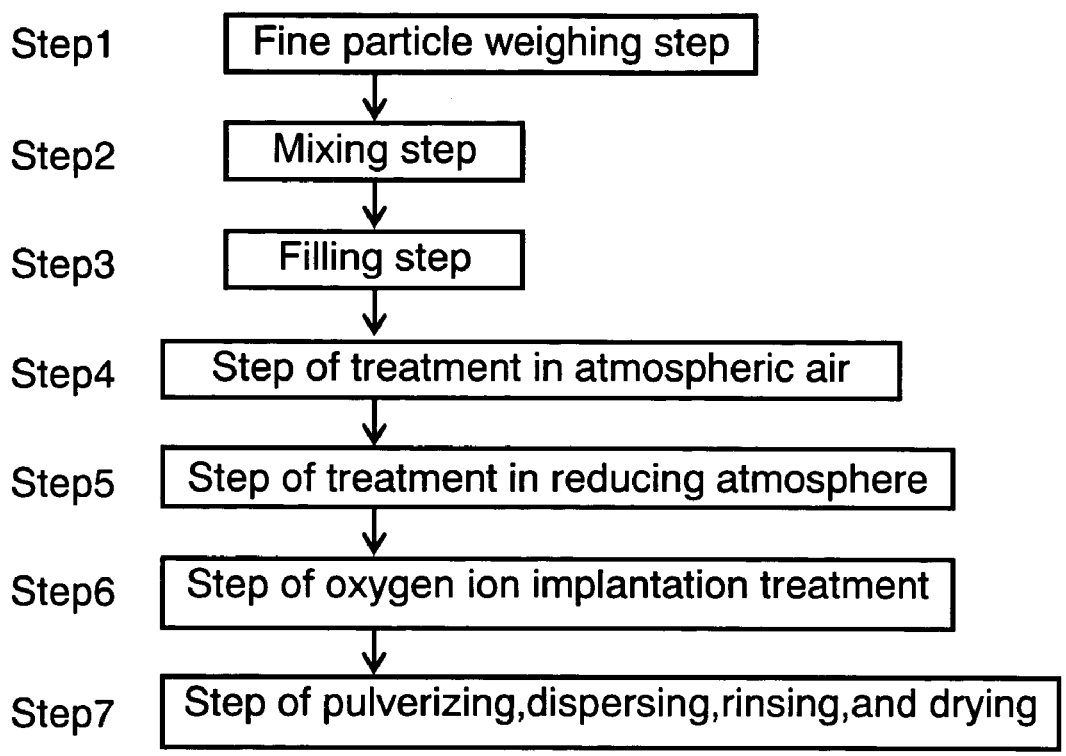
FIG. 1 is a flowchart showing a method of fabricating a phosphor in accordance with an exemplary embodiment of the present invention.

FIG. 1 is a flowchart showing a method of fabricating a phosphor in accordance with the exemplary embodiment of the present invention. Synthesis of an aluminate phosphor, $Ba_{(1-x-y)}Sr_yMgAl_{10}O_{17}$:$Eu_x$, is taken as an example.

In step 1, a step of weighing fine particles, generally the following carbonates, oxides, and hydrates are used and weighed as the materials of respective metals. In other words, barium compounds, e.g. barium carbonate, barium hydrate, barium oxide, and barium nitrate, are used as barium materials. Strontium compounds, e.g. strontium carbonate, strontium hydrate, and strontium nitrate, are used as strontium materials. Magnesium compounds, e.g. magnesium carbonate, magnesium hydrate, magnesium oxide, and magnesium nitrate, are used as magnesium materials. Aluminum compounds, e.g. aluminum oxide, aluminum hydrate, and aluminum nitrate, are used as aluminum materials. Europium compounds, e.g. europium oxide, europium carbonate, europium hydrate, and europium nitrate, are used as europium materials. These materials are weighed out so as to have a predetermined molar ratio of constituting ions. Each material is not limited to carbonate, oxide, or hydrate, and can be any compound.

In step 2, a mixing step, a fluxing agent, i.e. a crystal growth accelerator, such as aluminum fluoride, barium fluoride, and magnesium fluoride, is mixed into the weighed materials, as required. In this embodiment, a ball mill is used as a mixing means, for example, to mix the materials for one to five hours. The materials can be mixed using a ball mill by a wet method. However, instead of the mixing method using a ball mill, a co-precipitation method, a method of mixing materials made of alkoxide of respective metals in a liquid phase, or other methods can be used.

In step 3, a filling step, such a mixture is filled into a heat-resistant crucible, such as a high-purity alumina crucible.

In step 4, a step of treatment in atmospheric air, the mixed powders filled in the crucible is fired in atmospheric air at temperatures ranging from 800 to 1,500° C. for one to 10 hours so that the growth of the host crystal is accelerated. Incidentally, because step 4 is for accelerating the crystal growth, it is not an essential step.

In step 5, a step of treatment in a reducing atmosphere, the mixed powders filled are fired in a reducing atmosphere, e.g. nitrogen atmosphere, at temperatures at which a desired crystal structure can be formed. The aluminate phosphor of the exemplary embodiment of the present invention is fired in the temperature range of 1,100 to 1,500° C., for one to 50 hours.

In step 6, a step of oxygen ion implantation treatment, after phosphor powders of predetermined sizes are implanted with oxygen ions, they are annealed at temperatures ranging from 500 to 600° C., for approximately five hours. Such oxygen ion implantation allows oxygen atoms to enter into the oxygen vacancy of the host crystal generated during the treatment in the reducing atmosphere, and thus the oxygen vacancy is recovered.

In step 7, a step of pulverizing, dispersing, rinsing and drying the phosphor, after the mixed powders implanted with ions are sufficiently cooled, they are pulverized, dispersed, and rinsed by a wet method for one hour, using a bead mill, for example, as a dispersing means. Now, the mixed powders can be pulverized and dispersed using any dispersing device, e.g. a ball mill and jet mill, other than the bead mill. Thereafter, the phosphor powders pulverized, dispersed, and rinsed are dehydrated, and sufficiently dried; then sieved out to provide phosphor powders.

In this embodiment, the step of treatment in a reducing atmosphere and the following step of oxygen ion implantation treatment are performed once each. However, the step of treatment in a reducing atmosphere to enhance luminance by activating Eu bivalent, and the step of oxygen ion implantation treatment to recover oxygen vacancy in the host crystal can be repeated a plurality of times. Additionally, one or more step of treatment in atmospheric air to accelerate the growth of the host crystal can be provided before the step of treatment in a reducing atmosphere. After each treatment step, the powders can be pulverized, dispersed, and rinsed.

Figure 2:
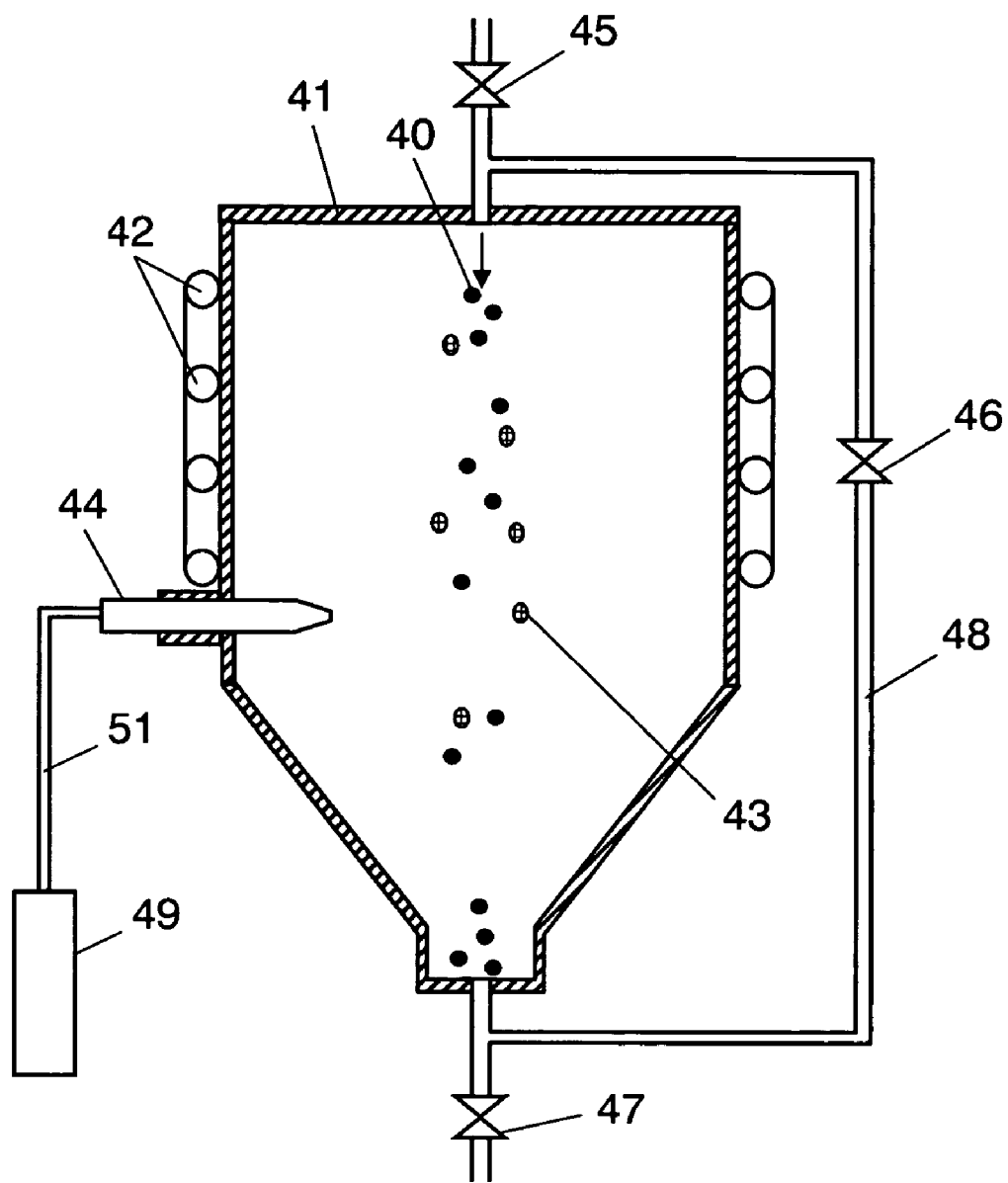
FIG. 2 is a sectional view of a treatment device for implanting oxygen ions in accordance with the exemplary embodiment of the present invention.

FIG. 2 is a sectional view of a treatment device for implanting oxygen ions in accordance with the exemplary embodiment of the present invention. The temperature of vacuum chamber 41 can be controlled by heater 42 in the range of 400 to 700° C. After inlet valve 45 above vacuum chamber 41 is opened, phosphor 40 having oxygen vacancy is fed from the top of vacuum chamber 41, and dropped by the small amount. At the middle of vacuum chamber 41, ion gun 44, an oxygen ion source, is provided. Ion gun 44 structured to use a high-frequency power supply is preferable. Oxygen gas is supplied from cylinder 49 through pipe 51. The oxygen gas is ionized by plasma generated by a high-frequency power supply (not shown). The ionized gas is accelerated at a predetermined accelerating voltage to provide oxygen ion beams. Then, phosphor 40 having oxygen vacancy dropped is irradiated with an oxygen ion beam, and thus changed to phosphor 43 having oxygen vacancy recovered.

One oxygen ion beam can be radiated onto only the limited surfaces of phosphor 40 having oxygen vacancy. For complete oxygen vacancy recovery, transfer pipe valve 46 is opened to allow phosphor 40 having oxygen vacancy to go upward through transfer pipe 48 and drop into vacuum chamber 41 again. This operation is repeated until the oxygen vacancy is completely recovered. After phosphor 40 having oxygen vacancy undergoes a predetermined oxygen vacancy recovery treatment, it is taken out by relieving vacuum and opening exhaust valve 47.

Next, various kinds of aluminate phosphors, $Ba_{(1-x-y)}Sr_yMgAl_{10}O_{17}:Eu_x$, are treated at least in a reducing atmosphere and then subjected to oxygen ion implantation. The characteristics of respective aluminate phosphors are described according to the examples.

EXAMPLE 1

Powders of sufficiently dry barium carbonate [$BaCO_3$], magnesium carbonate [$MgCO_3$], europium oxide [$Eu_2O_3$], and aluminum oxide [$Al_2O_3$] are prepared as the materials. These materials are weighed out so as to have a molar ratio of constituting ions of Ba:Mg:Eu:Al=0.99:1.00:0.01:10.00. Next, after aluminum fluoride is added to the weighed materials, as a crystal growth accelerator, the mixture is mixed for three hours using a ball mill.

Next, the mixture is filled into a high-purity alumina crucible and fired in atmospheric air at a temperature of 1,200° C. for one hour. Then, the mixed powders fired are fired again in a reducing atmosphere containing 20% of nitrogen gas and 80% of hydrogen gas, at 1,200° C. for 10 hours. Sequentially, after the fired powders are pulverized, dispersed, rinsed, dried, and classified, they are repeatedly irradiated with oxygen ion beams several times using the device for implanting oxygen ions of FIG. 2. The amount of oxygen introduced from the ion gun is 10 cc/min. Thereafter, the temperature in the vacuum chamber is set to 500° C., and the powders are annealed for five hours.

Then, the powders that have undergone these treatments are rinsed. The rinsed mixed power phosphor is dehydrated, sufficiently dried, and then sieved out to provide phosphor powder having a general formula of $Ba_{0.99}MgAl_{10}O_{17}:Eu_{0.01}$.

Next, the fabricated phosphor powder is irradiated with vacuum ultraviolet light having a peak wavelength of 146 nm obtained by a vacuum ultraviolet excimer laser irradiation equipment (146-nm light irradiation equipment manufactured by Ushio Inc.), and the luminance with respect to the irradiation time is measured using a luminance meter (LS-110 manufactured by Konika Minolta Japan). In this invention, as the characteristic value of luminance, a relative luminance value defined hereinafter is set to a performance index. The relative luminance value is obtained by multiplying the relative initial luminance of each phosphor by a luminance sustaining factor. Now, the relative initial luminance is defined as follows. When the initial luminance of a conventional phosphor is set to 100, the rate of the initial luminance of each example is indicated by the relative initial luminance. The luminance sustaining factor is a percentage obtained by dividing the luminance of the material of each example after 5,000 hours by its initial luminance. In other words, the relative luminance value is for comparing the luminance of phosphors after a curtain period between the conventional phosphor and the phosphor of the example. The ratios of constituting materials, treatment conditions, and relative luminance values are shown in Table 1.

EXAMPLES 2 AND 3

Example 2 is made of the same materials as Example 1; however, it has a molar ratio of constituting ions of Ba:Mg:Eu:Al=0.9:1.0:0.1:10.0. Example 3 is also made of the same materials as Example 1; however, it has a molar ratio of constituting ions of Ba:Mg:Eu:Al=0.8:1.0:0.2:10.0. The difference between Examples 2 and 3, and Example 1 is as follows. For Example 2, the mixture is fired in atmospheric air at 1,400° C. for one hour, and in a reducing atmosphere having a partial pressure ratio of $N_2:H_2$=95:5 at 1,100° C. for 10 hours. For Example 3, the mixture is fired in atmospheric air at 800° C. for one hour, and in a reducing atmosphere having a partial pressure ratio of 100% of $N_2$ at 1,200° C. for 10 hours. Then, phosphor powders fabricated under these conditions are evaluated using the relative luminance values like Example 1. Table 1 shows treatment conditions, relative luminance values, and other results.

EXAMPLES 4 THROUGH 9

For all these examples, powder of strontium carbonate [$SrCO_3$] is added to the materials of Example 1. However, Example 4 has a molar ratio of constituting ions of Ba:Sr:Mg:Eu:Al=0.89:0.10:1.00:0.01:10.00. Example 5 has a molar ratio of constituting ions of Ba:Sr:Mg:Eu:Al=0.8:0.1:1.0:0.1:10.0. Example 6 has a molar ratio of constituting ions of Ba:Sr:Mg:Eu:Al=0.7:0.1:1.0:0.2:10.0. Example 7 has a molar ratio of constituting ions of Ba:Sr:Mg:Eu:Al=0.69:0.30:1.00:0.01:10.00. Example 8 has a molar ratio of constituting ions of Ba:Sr:Mg:Eu:Al=0.6:0.3:1.0:0.1:10.0. Example 9 has a molar ratio of constituting ions of Ba:Sr:Mg:Eu:Al=0.5:0.3:1.0:0.2:10.0. The difference between Examples 4 through 9 and Example 1 is as follows. Example 4 is not fired in atmospheric air, and fired in a reducing atmosphere having a partial pressure ratio of 100% of $H_2$ at 1,100° C. for 10 hours. Example 5 is fired in atmospheric air at 1,300 C. for one hour, and in a reducing atmosphere having a partial pressure ratio of $N_2:H_2$=99:1 at 1,200° C. for 10 hours. Example 6 is fired in atmospheric air at 1,400 C. for one hour, and in a reducing atmosphere having a partial pressure ratio of $N_2:H_2$=90:10 at 1,400° C. for 10 hours. Example 7 is fired in atmospheric air at 1,300 C. for one hour, and in a reducing atmosphere having a partial pressure ratio of $N_2:H_2$=98:2 at 1,300° C. for 10 hours. Example 8 is fired in atmospheric air at 1,000 C. for one hour, and in a reducing atmosphere having a partial pressure ratio of $N_2:H_2$=90:10 at 1,300° C. for 10 hours. Example 9 is fired in atmospheric air at 1,200 C. for one hour, and in a reducing atmosphere having a partial pressure ratio of $N_2:H_2$=50:50 at 1,300 C. for 10 hours. Then, phosphor powders fabricated under these conditions are evaluated using the relative luminance values like Example 1. Table 1 shows treatment conditions, relative luminance values, and other results.

TABLE 1

| | Molar ratio of constituting ions | | | | Atmospheric air Temperature | Reducing atmosphere Temperature $H_2$ concentration | Oxygen ion implantation Amount of implantation Annealing temperature | Relative luminance value |
|---|---|---|---|---|---|---|---|---|
| | Ba | Sr | Eu | General formula | | | | |
| Example 1 | 0.99 | 0 | 0.01 | $Ba_{0.99}MgA_{110}O_{17}:Eu_{0.01}$ | 1200° C. | 1200° C. 80% | 10 cc/min 500° C. | 76 |
| Example 2 | 0.9 | 0 | 0.1 | $Ba_{0.9}MgAl_{10}O_{17}:Eu_{0.1}$ | 1400 | 1100 5 | | 94 |
| Example 3 | 0.8 | 0 | 0.2 | $Ba_{0.8}MgAl_{10}O_{17}:Eu_{0.2}$ | 800 | 1200 0 | | 92 |
| Example 4 | 0.89 | 0.1 | 0.01 | $Ba_{0.89}Sr_{0.1}MgAl_{10}O_{17}:Eu_{0.01}$ | — | 1100 100 | | 73 |
| Example 5 | 0.8 | 0.1 | 0.1 | $Ba_{0.8}Sr_{0.1}MgAl_{10}O_{17}:Eu_{0.1}$ | 1300 | 1200 1 | | 89 |
| Example 6 | 0.7 | 0.1 | 0.2 | $Ba_{0.7}Sr_{0.1}MgAl_{10}O_{17}:Eu_{0.2}$ | 1400 | 1400 10 | | 94 |
| Example 7 | 0.69 | 0.3 | 0.01 | $Ba_{0.69}Sr_{0.3}MgAl_{10}O_{17}:Eu_{0.01}$ | 1300 | 1300 2 | | 77 |
| Example 8 | 0.6 | 0.3 | 0.1 | $Ba_{0.6}Sr_{0.3}MgAl_{10}O_{17}:Eu_{0.1}$ | 1000 | 1300 10 | | 94 |

TABLE 1-continued

| | Molar ratio of constituting ions | | | | Atmospheric air Temperature | Reducing atmosphere Temperature $H_2$ concentration | Oxygen ion implantation Amount of implantation Annealing temperature | Relative luminance value |
|---|---|---|---|---|---|---|---|---|
| | Ba | Sr | Eu | General formula | | | | |
| Example 9 | 0.5 | 0.3 | 0.2 | $Ba_{0.5}Sr_{0.3}MgAl_{10}O_{17}$:$Eu_{0.2}$ | 1200 | 1300 50 | | 77 |
| Comparative Example | 0.8 | 0.1 | 0.1 | $Ba_{0.8}Sr_{0.1}MgAl_{10}O_{17}$:$Eu_{0.1}$ | 1300 | 1200 1 | — | 69 |

COMPARATIVE EXAMPLE

As a comparative example, a phosphor having the same molar ratio of the constituting ions as Example 5 is fabricated by the conventional fabricating method (conventional phosphor). The difference from Example 5 is that comparative example has no step of oxygen ion implantation treatment for oxygen vacancy recovery. The luminance sustaining factor of this sample is 69%, and thus the relative luminance value is 69.

As obvious from Table 1, the average relative luminance value of aluminate phosphors of $Ba_{(1-x-y)}Sr_yMgAl_{10}O_{17}$:$Eu_x$ is larger than the relative luminance value of the comparative example, the conventional phosphor, by 16, in the range of $0.01 \leq x \leq 0.2$ and $0 \leq y \leq 0.3$, and the emission luminance has increased. When the amount of Ba, Sr, and Eu, i.e. x and y, in the aluminate phosphors of $Ba_{(1-x-y)}Sr_yMgAl_{10}O_{17}$:$Eu_x$ are within the above range, remarkable effects are obtained. However, for the amount of Mg and Al, when they are within the composition range of approximately ±5% of the above molar quantities (Mg=1, and Al=10), the effect of improving emission efficiency has not changed.

In Examples 1 through 9, conditions for firing in reducing atmospheres and preceding conditions for firing in atmospheric air for fabricating the samples are varied. However, it is considered that not the influence of these different conditions on the relative luminance values, but the existence of oxygen ion implantation treatment leads to the difference in the relative luminance values. This is because a difference in the relative luminance value of 20 is observed especially between Example 5 and the comparative example, in which the molar ratio of the constituting ions is identical but the existence of oxygen ion implantation treatment for oxygen vacancy recovery is different. Further, the effect of oxygen ion implantation treatment can be inferred from the following reasons.

Firstly, Eu is often used as an activator that can be bivalent and trivalent. In the example of BAM, a blue phosphor, it is necessary that bivalent Eu substitutes for bivalent Ba while the host crystal of $Ba_{(1-x)}MgAl_{10}O_{17}$ is grown from its materials, to produce a stable emission center $Eu^{2+}$. For this purpose, as a conventional basic firing method, the materials are fired in an appropriate reducing atmosphere at high temperatures ranging from 1,000 to 1,500° C., for at least four hours.

Secondly, as to the recovery of the oxygen vacancy of the host crystal generated in the reducing atmosphere, the effect of recovering oxygen vacancy has been recognized when the phosphor is implanted with oxygen ions and annealed at temperatures ranging from 500 to 600° C.

Incidentally, Sr need not be contained in the composition of the phosphor. However, if Sr is contained, $Sr^{2+}$ having a smaller ion diameter substitutes for a part of $Ba^{2+}$, and the lattice constant of the crystal structure is slightly reduced. Thus, the emission color of the blue phosphor can be made more desirable color.

Figure 3:
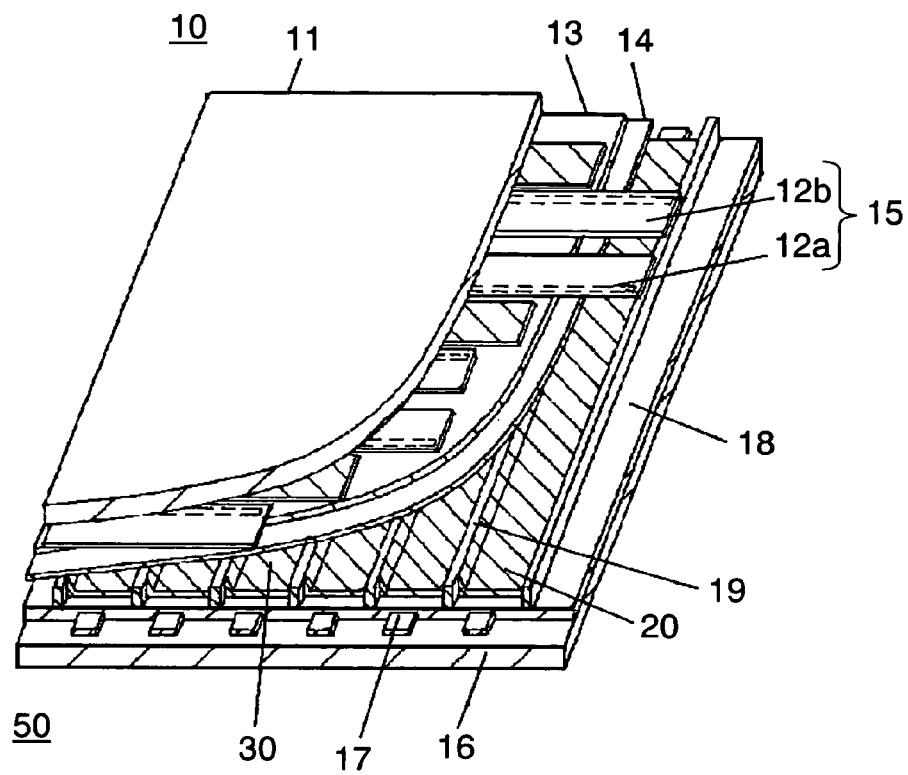
FIG. 3 is a perspective view of an essential part of a plasma display device in accordance with the exemplary embodiment of the present invention.

Next, FIG. 3 is a perspective view of an essential part of a plasma display device in accordance with the exemplary embodiment of the present invention. In front panel 10, display electrodes 15, each made of scan electrode 12a and sustain electrode 12b, and dielectric layer 13 covering display electrodes 15 are formed on transparent and insulating front substrate 11. Further on this dielectric layer 13, protective layer 14 is formed.

A predetermined number of display electrodes 15 are formed at a constant pitch on front substrate 11. Dielectric layer 13 is generally formed by printing and firing low-melting glass because the dielectric layer is formed after formation of display electrodes 15 to securely cover these display electrodes 15. As the materials of the glass paste, a low-melting glass paste having the composition of so-called (PbO—SiO$_2$—B$_2$O$_3$—ZnO—BaO) glass, containing lead monoxide [PbO], silicon oxide [SiO$_2$], boron oxide [B$_2$O$_3$], zinc oxide [ZnO], and barium oxide [BaO], can be used. Using this glass paste and repeating screen-printing and firing, for example, can easily provide dielectric layer 13 having a predetermined thickness. The thickness may be set according to the thickness of display electrodes 15 and target electrostatic capacity or other factors. In this embodiment of the present invention, the thickness of dielectric layer 13 is approximately 40 μm. Additionally, a glass paste containing at least one of lead monoxide [PbO], bismuth oxide [Bi$_2$O$_3$], and phosphorus oxide [PO$_4$] as a major constituent can be used.

Protective layer 14 is provided so that plasma discharge does not sputter dielectric layer 13. Thus, the protective layer is required to be a highly sputtering-resistant material. For this reason, magnesium oxide [MgO] is often used.

On the other hand, on rear substrate 16 that is transparent and insulating like the front substrate, data electrodes 17 for writing image data are formed in the direction perpendicular to display electrodes 15 on front panel 10. After insulating layer 18 is formed on rear substrate 16 to cover these data electrodes 17, barrier rib 19 is formed in parallel with and substantially at the center of each data electrode 17. The areas sandwiched between barrier ribs 19, phosphor layers 20 are formed to constitute rear panel 50. These phosphor layers 20 are formed adjacent to phosphors emitting red (R), green (G), or blue (G) light. These phosphor layers constitute pixels.

Formed as data electrodes 17 are films having laminated structures, such as a single-layer film made of silver, aluminum, or cupper having low electric resistance, a two-layer film made of chromium and cupper, and a three-layer film made of chromium, cupper, and chromium, using thin-film forming techniques, such as printing and firing, or sputtering. Insulating layer 18 can be formed by the same materials and film-forming methods as dielectric layer 13. Additionally, a glass paste containing at least one of lead monoxide [PbO], bismuth oxide [$Bi_2O_3$], and phosphorus oxide [$PO_4$] as a major constituent can be used. The phosphors fabricated by the above methods and emitting R, G, or B light are applied to the areas sandwiched between barrier ribs 19 by an inkjet method, for example, to form phosphor layers 20.

When front panel 10 and rear panel 50 are faced with each other, discharge space 30 surrounded by barrier ribs 19, protective layer 14 on front substrate 11, and phosphor layers 20 on rear substrate 16 is formed. Then, when this discharge space 30 is filled with a mixed gas of Ne and Xe at a pressure of approximately 66.5 kPa, and alternating voltages ranging from several dozens to several hundred kilohertz are applied across each scan electrode 12a and corresponding sustain electrode 12b for discharge, phosphor layers 20 can be excited by ultraviolet light generated when excited Xe atoms return to their ground state. This excitation causes phosphor layers 20 to emit R, G, or B light according to the materials applied thereto. For this reason, when the pixels at which data electrodes 17 emit light and colors of the light are selected, necessary colors can be emitted at predetermined pixel sections for color image display.

Figure 4:
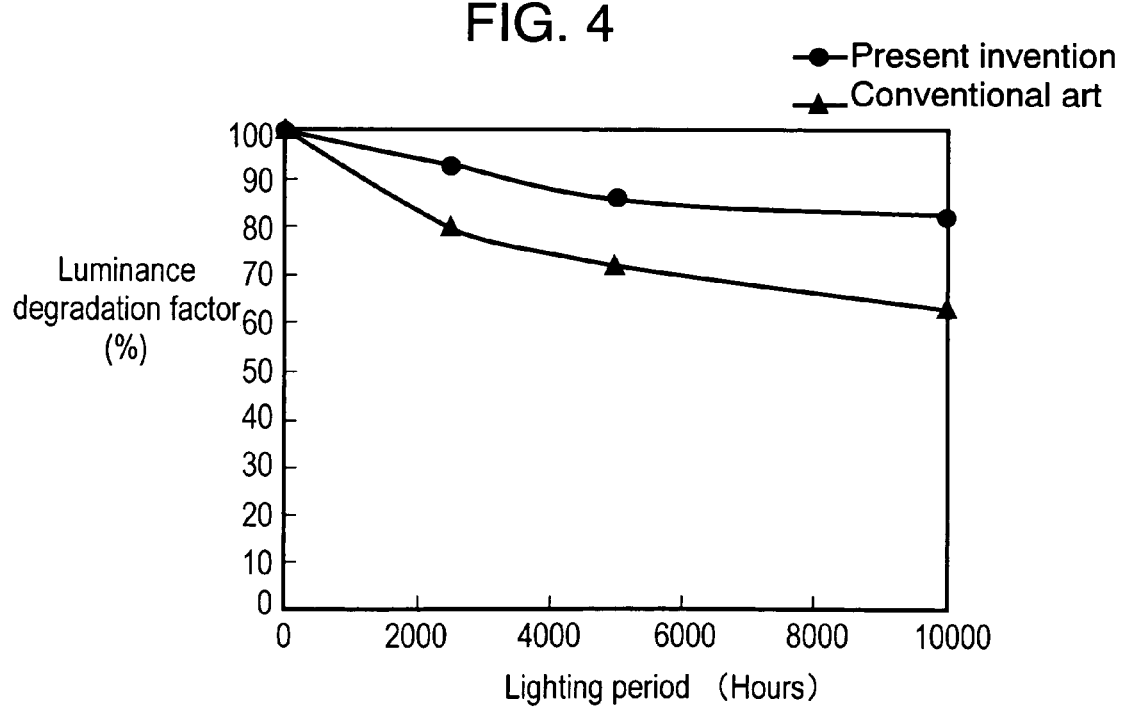
FIG. 4 is a graph showing a luminance degradation factor of the phosphor for use in the plasma display device in accordance with the exemplary embodiment of the present invention.

FIG. 4 is a graph showing luminance degradation factors of the phosphors for use in the plasma display device. Pulse voltages having an amplitude of 180V and a frequency of 15 kHz are applied across display electrodes 15. The variations of emission luminance with time are examined for the phosphor of Example 5 fabricated in accordance with the exemplary embodiment of the present invention and the phosphor of the comparative example fabricated by the conventional method. The initial emission luminance is set to 100% and the emission luminance after each lighting period is divided by the initial emission luminance to provide a luminance degradation factor. For the phosphor fabricated by the conventional method, the luminance degradation factor after 5,000 hours decreases to 72%. In contrast, for the phosphor fabricated in accordance with this exemplary embodiment of the present invention, an emission luminance of 86% is maintained. Even only in terms of the luminance degradation factor, an improvement of 14% has obtained, and luminance degradation has been inhibited. This is because the phosphor fabricated in accordance with this exemplary embodiment is implanted with oxygen ions after being fired in a reducing atmosphere, and thus has less oxygen vacancy and a smaller part of anamorphous structure in its crystal structure. As a result, even with irradiation of ultraviolet light or ion impact applied thereto, degradation of the crystal structure and thus luminance degradation are smaller.

In the description of this exemplary embodiment of the present invention, $Eu^2+$ is used as an activator in BAM phosphors. However, also for other phosphors using $Eu^2+$ as an activator, such as $CaMgSi_2O_6$:Eu, and a green phosphor (Ba, Sr, Mg)O.a$Al_2O_3$:Mn in which $Mn^2+$ is used as an activator and its host crystal is made of an oxide, the oxygen ion implantation has effects of increasing emission luminance and inhibiting luminance degradation.

The present invention provides a method of fabricating a phosphor capable of recovering its oxygen vacancy without decreasing its emission luminance, even in the case of a phosphor in which its emission center, Eu or Mn, must be activated bivalent and its host crystal is made of an oxide. Further, this fabricating method can provide a plasma display device having higher emission luminance and lower luminance degradation.

INDUSTRIAL APPLICABILITY

The present invention can recover oxygen vacancy of a phosphor without decreasing its emission luminance, even in the case of a phosphor in which its emission center, Eu or Mn, must be activated bivalent and its host crystal is made of an oxide. The present invention is useful to improve the performance of image display devices represented by a plasma display device and illuminators represented by a rare-gas discharge lamp and a high-load fluorescent lamp.

The invention claimed is:

1. A method of fabricating a phosphor in which at least one of Eu and Mn is added as an activator thereof and a multiple oxide containing at least one of elements Ba, Ca, Sr, and Mg is a host crystal thereof, said method comprising:
   firing mixed materials of said phosphor in a reducing atmosphere at least once; and
   performing oxygen ion implantation treatment to a powder of the phosphor for implanting oxygen ions after the step of treatment in the reducing atmosphere, wherein the powder is repeatedly irradiated with an oxygen ion beam by the oxygen ion implantation treatment.

2. The method of fabricating a phosphor of claim 1, wherein, a composition formula of the phosphor is $Ba_{(1-x-y)}Sr_yMgAl_{10}O_{17}$: $Eu_x$, where $0.01 \leq x \leq 0.20$ and $0 \leq y \leq 0.30$.

* * * * *